United States Patent [19]

Nakamura

[11] 4,274,332
[45] Jun. 23, 1981

[54] DIE CHANGING APPARATUS FOR PRESS

[76] Inventor: Iwao Nakamura, c/o Futaba Denshi Kogyo K.K. 629, Oshiba, Mobara-shi, Chiba-ken, Japan

[21] Appl. No.: 137,268

[22] Filed: Apr. 4, 1980

[30] Foreign Application Priority Data

Apr. 11, 1979 [JP] Japan .................................. 54-42963

[51] Int. Cl.³ ............................................. B30B 15/02
[52] U.S. Cl. ..................................... 100/299; 72/448; 72/481; 83/698
[58] Field of Search .............. 100/DIG. 18, 299, 295; 83/637, 698; 72/446, 447, 448, 481

[56] References Cited

U.S. PATENT DOCUMENTS

| 3,104,574 | 9/1963 | Andersen et al. | 100/DIG. 18 |
| 3,702,560 | 11/1972 | Weidel | 72/481 |
| 4,052,919 | 10/1977 | McKissack | 100/DIG. 18 |

*Primary Examiner*—Billy J. Wilhite
*Attorney, Agent, or Firm*—Oblon, Fisher, Spivak, McClelland & Maier

[57] ABSTRACT

A die changing apparatus is disclosed, which includes a base or bed having holes, a die mounting base plate having holes registering with those of the base, brackets arranged on the upper surface of the base having holes registering with those of the base plate and the base in which guide pins are accomodated to set the position of the base plate with respect to the base by registering the respective holes of the brackets, the base plate and the base and inserting the guide pins into these holes, and eccentric cams for clamping the base plate on the surface of the base driven in synchronizing with the actuation of the guide pins.

10 Claims, 15 Drawing Figures

DIE CHANGING APPARATUS FOR PRESS

BACKGROUND OF THE INVENTION

1. Field of the Invention

This invention relates to a press, and more particularly to a die changing apparatus for quickly and accurately mounting and exchanging dies to be mounted on the press.

2. Description of the Prior Art

With the recent increase in variety of products which can be produced by a press work operation or the reduction of life cycle of the products, a variety of products are produced in a small quantity in actual factories. When several sorts of the products are produced in the small quantity by the press work operation, it is required to change dies mounted on the press every time when a different type of the press work is conducted. This increases in the percentage of the mounting or exchanging operation of the die in the overall press work operation, which results in a decrease in the working efficiency of the press. In the production system explained hereinabove, it takes much time in such preparatory press work operations that upper and lower dies are prepared and mounted on the press in exact alignment therewith. Also, when determining the mounting position of these dies, accuracy and skill are required. Accordingly, it has now been an important problem to improve such preparatory operations in view of the reduction of working hours, the simplification of press work operations and the reduction of manufacturing cost.

In order to shorten and simplify the preparatory operations, various die changing apparatuses which are generally referred to as a quick die changing apparatus and make it possible to mount, exchange or alinge the dies on the press for a short period of time have been proposed, and some of the apparatus have been actually put to practical use.

The die changing apparatus of this type generally includes a means for determining mounting position of dies with respect to an upper surface of bolster of the press and a lower surface of the slide, or, when a die set is used, an upper surface of the die holder and a lower surface of the punch holder, and a means for fixing the dies thus determined the mounting positions at that locations. In such die changing apparatus, it is required that the actuating and releasing operations of the apparatus must be simply performed by a single step.

One example of this type of the die changing apparatus is disclosed in the Japanese Patent Publication No. 46-7668 wherein the positioning of dies is performed in such manners that a base plate on which a die is mounted is inserted into a guide hole formed in a vertically movable slider, the slider is actuated in the vertical direction by means of a pneumatic or hydraulic driving means so as to clamp the base plate onto a mounting surface of the base plate, and guide pins projecting from the mounting surface of the base plate are inserted into holes on the base plate.

In the conventional die changing apparatus, it has been a general practice to use such system that the die or the base plate on which the die is mounted is pressed against its mounting surface to be fixed thereto by using a clamp plate vertically movable with respect to the mounting surface by the pneumatic, hydraulic or manual driving means. However, it is too complicated in its mechanism and is high in the manufacturing cost. The die changing apparatus in which the vertical motion of the clamp plate is controlled by the pnuematic or hydraulic cylinder requires a large scale auxiliary apparatus. As a result, the entire apparatus becomes a large-size and the maintenance and inspection are too complicated.

In addition, in the apparatus having guide pins projected on the mounting surface of the base plate as a means for determining the mounting position of the base plate, the pins will be a hindrance for cleaning the mounting surface of the base plate, and if there exists dusts or the like on its surface, it is impossible to obtain a close contact between the base plate and its mounting surface, which results in deterioration in performing precision press work operations. Furthermore, holes or pockets forming operations are required to mount the dies on the base plate of the die changing apparatus. However, when applying the conventional die changing apparatus for machining the base plate, the existence of the chips or dusts remaining on the mounting surface of the base plate become detrimental obstacles for obtaining the base plate of the precision finishing which can be used as a reference for determining the position of the subsequent die change. Therefore, it can not be applicable to the base plate forming apparatus.

SUMMARY OF THE INVENTION

The present invention is intended to eliminate the above-mentioned disadvantages of the prior art and to provide a novel die changing apparatus.

Therefore, it is an object of the present invention to provide a die changing apparatus which is capable of effecting both positioning and clamping operations quickly and accurately at the same time by a single operation, thereby to simplify the die mounting and exchanging operations which requires much time and labor in advance of actual press work operations, and to remarkably increase working rate of the press machine in each of the working processes.

It is another object of the present invention to provide a die changing apparatus which is simple in structure and can be easily operated without using pneumatic or hydraulic power, thereby to make it possible to reduce the overall size of the apparatus, easily conduct the maintenance and inspection, reduce the manufacturing cost, standardize each of the component parts, and easily exchange the parts when there are troubles.

It is still another object of the present invention to provide a die changing apparatus which is capable of keeping a base plate in the accurate mounting position without causing a lateral shift and an accidental release due to vibrations during press work operations, thereby to make it possible to achieve a high degree of the press work operations.

It is further object of the present invention to provide a die changing apparatus which is easy to clean dusts or the like dispersed on an mounting surface of a base plate and can be used as a jig for a die molding or a die alignment by using the standardized base plate, thereby to make it possible to systematize the die changing operation.

Briefly, the foregoing and other objects of the present invention are attained by providing a die changing apparatus which comprises upper and lower plates of a die set for mounting base plates, the upper and lower plates being provided with holes; base plates standardized its outer dimension on which dies or die materials are mounted, the base plates being provided with guide holes at positions corresponding to the holes of the upper and lower plates communicating with one another; brackets mounted on the surfaces of the upper and lower plates, the brackets being provided with holes communicating with the guide holes of the base plates and the holes of the upper and lower plates; guide pins vertically movable in the holes of the brackets for positioning the base plate on the surfaces of the upper and lower plates which are actuated by a rack and pinion mechanism and inserted into the guide holes of the base plates and the holes of the upper and lower plates, and eccentric cams coaxially provided on the pinions of the rack and pinion mechanism, whereby clamping and positioning of the base plates with respect to the surfaces of the upper and lower plates are simultaneously effected by the action of the eccentric cams and the guide pins.

BRIEF DESCRIPTION OF THE DRAWINGS

Other objects and many of the attendant advantages of this invention will be readily appreciated as the same becomes better understood by reference to the following detailed description when considered in connection with the accompanying drawings, in which like reference characters designate the same or similar parts throughout the figures thereof and wherein.

DETAILED DESCRIPTION OF THE PREFERRED EMBODIMENTS

An embodiment of the present invention will be hereinafter described with reference to the accompanying drawings. A die changing apparatus shown in FIGS. 1 and 2 includes a lower plate 1 of a die set to be mounted on an upper surface of bolster of a press (not shown) and to be used as a base for a lower die. The lower plate 1 is provided with a pair of guide posts 2 embedded upright at the corners of the upper surface thereof. These guide posts 2 extend upwardly so as to slide into guide bushes (not shown) of an upper plate (not shown) of the die set which is fixed to the lower surface of a slider of the press so as to be used as a base for an upper die (not shown). With such arrangements, the vertical movements of both the upper and the lower dies fixed to the upper and lower plates of the die set can be achieved.

The lower plate 1 is also provided, at predetermined positions of the upper surface thereof, with at least two guide holes 3 (four holes are shown in the embodiment shown in FIG. 1), and bushes 4 are press-fitted into these holes 3 so that guide pins which will be hereinafter described may be tightly inserted therein.

The guide bushes 4 should be finished in a high degree of precision so that the center of each bush is geometrically positioned at each exact vertex of a square or rectangle. This is particularly important when base plates are subjected to the press finishing by using the die changing device according to the present invention, because the plates can be processed from both front and rear sides thereof.

The lower plate 1 further includes the base plate 5 to which the lower die 6 is fixed. The base plate 5 may be of standardized shape, dimensions and thickness, and the intersecting vertical and horizontal side faces thereof constitutes orthogonal two datum planes serving as a reference for positioning the die, and the die fixing operation and the die mounting position can be made on the basis of the datum planes. The base plate 5 is provided with at least two guide holes 7 (four holes are shown in the embodiment shown in FIG. 1) each having the same diameter as that of the bush 4. These guide holes 7 are drilled at the predetermined positions near the corners of the upper surface of the base plate accurately corresponding to the holes of the bushes 4 regulated by the orthogonal two datum planes of the base plate 5.

Brackets 8 (81–84) which are of inverted L-shape and overhanging around the corners of the base plate 5 are fixed to the upper surface of the lower plate 1 by means of, for instance, screw bolts. The brackets 81 and 82 form one pair, while the brackets 83 and 84 form another pair. Each bracket 8 has an overhang extending parallel to the surface of the base plate 5 having a clearance g so as to make the base plate 5 easily replaceable. The bracket 8 is provided with a cavity 8a in which to receive a pinion 9 and a bearing 8b for supporting an eccentric shaft which will be explained hereinafter.

The bracket 8 is also provided with a vertical hole 8c which is coaxial with the hole of the bush 4 in the lower plate 1, and a bush 10 having the same diameter as that of the bush 4 is press-fitted to the hole 8c. In addition, there is provided a peep hole 11 at the hole 8c and the bush 10 through which a portion of the pinion 9 in the cavity 8a can be observed.

The bush 10 receives a guide pin 12 which is tightly and reciprocateably inserted into the bush 10. The guide pin 12 is tapered at an end thereof and includes a rack 12a at a portion of the outer circumference thereof so as to engage with the pinion 9.

Figure 1:
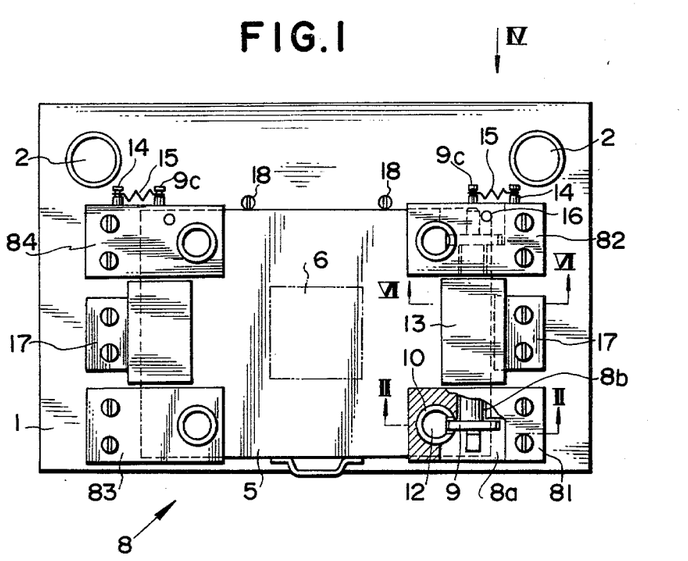
FIG. 1 is a partly broken away plan view of a die changing apparatus according to a preferred embodiment of the present invention.
Figure 2:
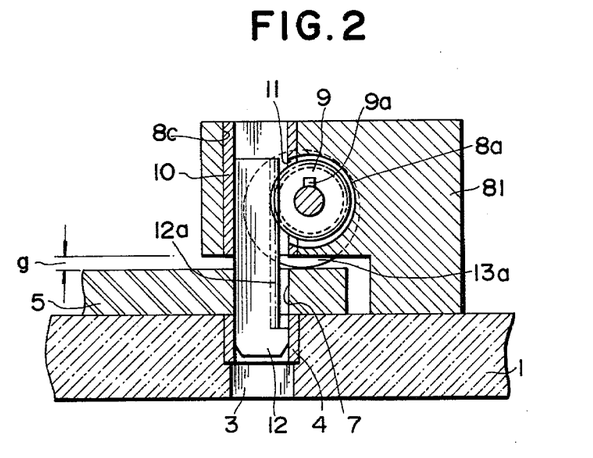
FIG. 2 is a vertical sectional view of the die changing apparatus taken along the line II—II of FIG. 1 looking in the direction of the arrow.
Figure 3:
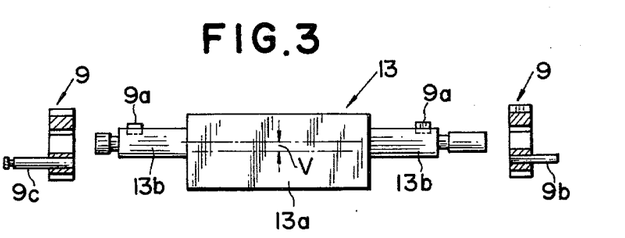
FIG. 3 is an exploded plan view, partly in section, of an eccentric shaft used in the die changing apparatus according to the present invention.

As shown in FIG. 3, each of the eccentric shafts 13 is supported by the brackets 81–82 and 83–84 at its stem portion 13b, and is provided with the pinions 9 which are fixed to the eccentric shafts 13 by keys 9a at both ends thereof. The eccentric shafts 13 constitute an eccentric cam and the eccentric sections 13a are positioned above both vertical side edges of the base plate 5 as shown in FIG. 1. The eccentric section 13a has an eccentricity V corresponding to the gap g shown in FIG. 2 between the upper surface of the base plate 5 and the lower surfaces of the brackets 81–82, and the stem section 13b is provided with the pinions 9 fixed to both ends thereof by keys 9a. One of the pinions 9 includes a pin 9b which extends parallel to the stem section 13b of the eccentric shaft 13 for fixing a handle to rotate the eccentric shafts 13, while the other pinion includes a pin 9c having a groove for fixing a spring at its terminating end.

Figure 4:
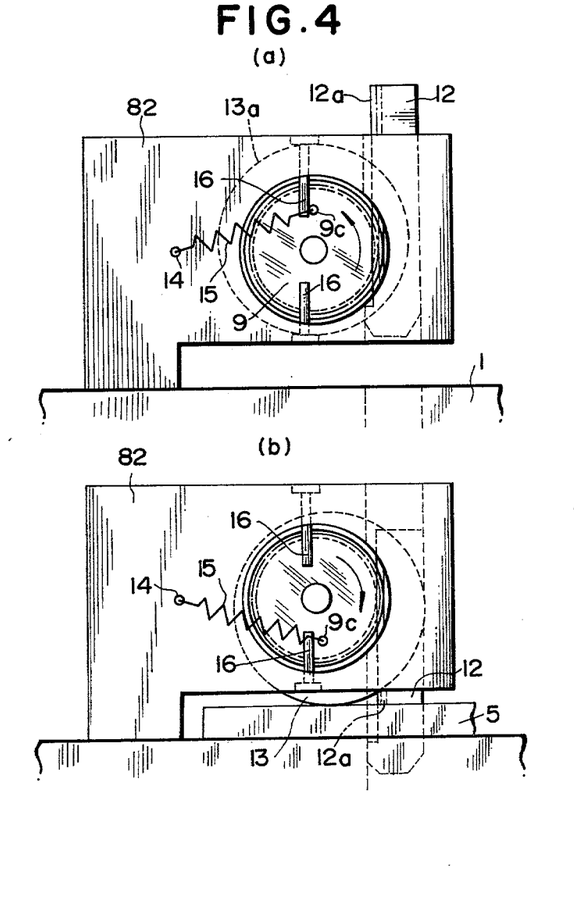
FIGS. 4(a) and 4(b) illustrate side elevations looking in the direction of the arrow IV in FIG. 1 illustrating an operation of the die changing apparatus according to the present invention.

On the outer side surfaces of the brackets 82 and 84, spring fitting pins 14 are embedded as shown in FIGS. 4(a) and 4(b), and tension springs 15 for actuating the guide pins 12 in either upward or downward position are stretched between the pins 14 and the pins 9c of the pinions 9. In addition, there are provided a pair of upper and lower stop pins 16 at the respective brackets 82 and 84. These stop pins 16 extend in the cavity 8a of the bracket and regulate the extent of the rotation of the pinion 9 which is effected by the tensile force of the spring 15 in the bracket to be contacted to the pin 9c. Numeral 17 designates guide plates for guiding the base plate 5 into the die set and numeral 18 designates stop pins for regulating the inserted position of the base plate 5.

Figure 5:
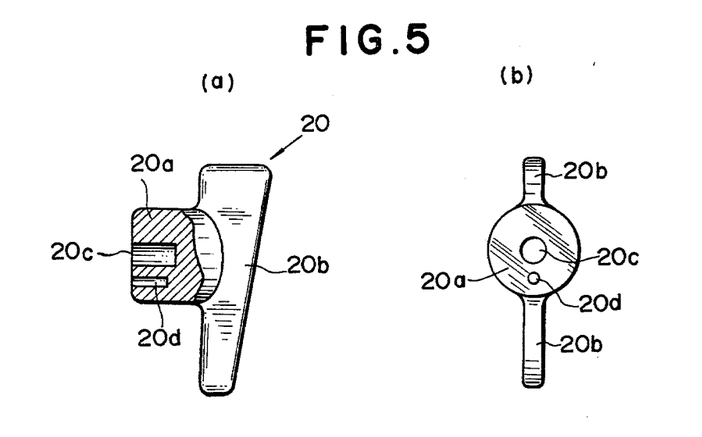
FIGS. 5(a) and 5(b) show a side elevation, partly in section, and a front view of a handle used in the die changing apparatus according to the present invention, respectively.

FIG. 5 shows a handle 20 adopted to rotate the eccentric shafts 13 supported by the brackets 81–82 and 83–84. The handle 20 comprises a boss 20a and a grip 20b. The boss 20a is of such configuration that it is easily inserted into cavities 8a of the brackets 81 and 83, and is provided with holes 20c and 20d for receiving the stem section 13b of the eccentric shaft 13 and the pin 9b embedded in one of the pinions 9, respectively.

In the die changing device according to the present invention, it is extremely important that all the bushes 4 to be press-fitted into the holes of the upper plate (not shown) and the lower plate 1 are subjected to precision finish so that when both plates are combined to form a die set, the hole of each bush in the upper plate corresponds exactly to that of the lower plate with the minimum offset, if any. Otherwise, even if both upper and lower dies are mounted on both upper and lower plates accurately aligning the upper and lower dies in the preceding die mounting step, any offset between the holes of the bushes in the upper and lower plates will reduce the accuracy of alignment of these dies in proportion to such offset at the time of mounting the base plate 5 on the die set.

In the foregoing explanation, no specific explanation has been made with respect to the arrangement on the upper plate of the die set, however, it is to be noted that the upper plate is constructed exactly in the same manner as the lower plate of the die set.

The operation of the die changing apparatus according to the present invention will now be explained hereinafter.

When the base plate 5 is mounted on the lower plate 1, the handle 20 is connected to the eccentric shaft 13 by making its holes 20c and 20d fit in the stem section 13b and the pin 9b. The handle is then rotated counterclockwise as shown in FIG. 4(a) to rotate the eccentric shaft 13. The rotation of the eccentric shaft 13 causes the two pinions 9 mounted on the ends of the stem section 13b to rotate which in turn causes the guide pins 12 which are penetrated into the bushes 4 of the lower plate 1 through the guide holes 7 of the base plate and are provided with the rackes 12a engaging with the pinions 9 to retract from the bushes 4 and the guide holes 7. In this case, the pin 14 and the pin 9c are biased by the spring 15, thus, the handle 20 must be rotated by exerting sufficient torque to overcome the tensile force of the spring 15. However, when the pin 9c is beyond its dead point by the rotation of the pinions 9, the pinions 9 begin to rotate by itself due to the tensile force of the spring 15 until the pin 9c runs against the upper stop pin 16 and the further rotation of the pinions is prevented by the upper stop pin 16 as shown in FIG. 4(a).

Figure 6:
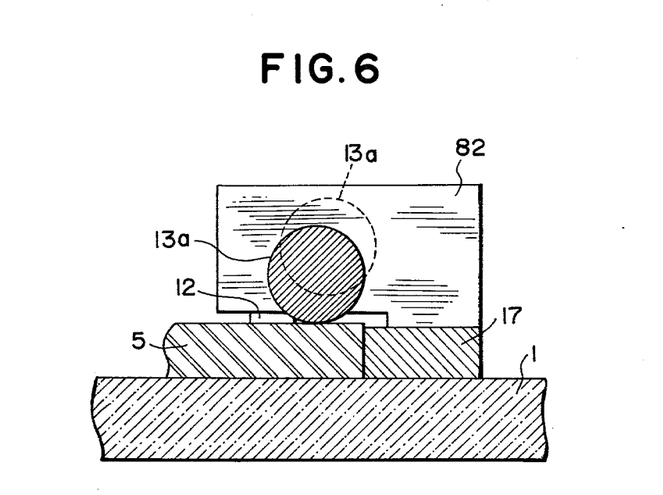
FIG. 6 is a vertical sectional view of the die changing apparatus taken along the line VI—VI of FIG. 1 looking in the direction of the arrow.

In accordance with the rotation of the pinions 9 on the eccentric shaft 13, the guide pins 12 move upwardly and are extracted from bushes 4 of the lower plate and guide holes 7 of the base plate 5. At the same time, the eccentric section 13a of the eccentric shaft is rotated up to the position indicated by the dotted line shown in FIG. 6 by the rotation of the stem section 13b. Then, there is no obstacle for hindering the replacement of the base plate 5 between the upper surface of the lower plate 1 and the lower surface of the bracket.

Under the condition, the base plate 5 on which the lower die 6 is mounted or the base plate for renewing the existing one is inserted into openings formed between the brackets 81–84 and the lower plate 1 while determining the mounting position roughly by the guide plates 17 and the stop pins 18.

After the base plate 1 is mounted in position on the lower plate 1, the handle 20 shown in FIG. 5 is again connected to the eccentric shaft 13 by being inserted into the stem section 13b and the pin 9b of the eccentric shaft 13 in the manner as described hereinabove, and the handle 20 is rotated clockwise at this time as shown in FIG. 4(b).

By the rotating operation of the handle 20, the pinions 9 on the eccentric shaft 13 is rotated against the tensile force of the spring 15, and when the pin 9c goes beyond its dead point, the pinions 9 is rotated by itself due to the tensile force of the spring 15 without operating the handle 20 until the outer circumferential surface of the eccentric section 13a of the eccentric shaft 13 runs against the surface of the base plate 5. At the same time, the guide pins 12 of the brackets are lowered by the rotation of the pinions 9 in the clockwise direction.

The base plate 5 under this condition is not always accurately in alignment with the lower plate 1, although the mounting position of the base plate 5 is roughly regulated by the guide plates 17 and the stop pins 18. However, as the guide pins 12 are lowered and the tapered ends of the guide pins 12 are entered into the respective guide holes 7, the dislocation of the base plate 5 with respect to the lower plate 1 is corrected, and the extremely accurate positioning of the base plate 5 with respect to the lower plate 1 can be achieved, because of the existence of the guide holes 7 which are formed so as to allow the guide pins 12 to be tightly inserted therein except the rack forming sections. When the eccentric shaft 13 is rotated, the eccentric section 13a of the eccentric shaft 13 is rotated to the position indicated by the solid line of FIG. 6 so that the vertical shift of the base plate 5 is prohibited by the eccentric section 13a. In this manner, both positioning and clamping operations of the base plate 5 are simultaneously performed accurately and quickly by the rotation of the pinions 9.

In this instance, the pinions 9 are constantly subjected to clockwise torque by the action of the spring 15. Thus, the base plate 5 is firmly clamped by the eccentric section 13a of the eccentric shaft 13 and the clamping does not loose due to vibrations during the press work operations, because the clamping force exerted by the spring by means of the eccentric section 13a is constantly acted upon the base plate. Futhermore, the guide pins 12 are tightly inserted into the bushes 10 of the brackets 81-84, the guide holes 7 of the base plate 5 and the bushes 4 of the lower plate 1 by having both axial ends firmly held by the bushes 10 and 4. Accordingly, even when pressure is applied to the base plate 5 in its lateral direction during the press work operation, there is no tendency of dislocating the base plate 5 and the press work operation can be performed in a condition keeping the position of the base plate in order. The clamping force exerted to the base plate 5 by the eccentric section 13a of the eccentric shaft 13 may be such strength that the vertical movement of the base plate is supressed, because the horizontal movement thereof is restrained by the guide pins 12. It is not necessary to clamp the base plate 5 by the application of as high as several tons of pressure.

As described hereinabove, according to the present invention, it is possible to fix or replace the base plate 5 on which the die is mounted in the extremely simple manner and for a short period of time by a single step of the rotation of the eccentric shaft 13. The eccentric shaft 13 may be rotated approximately by one-fourth, then, the pinions 9 are rotated by the tensile force of the spring 15, which results in the extraction of the guide pins from the respective holes and the rotation of the eccentric section 13a. Accordingly, in the present invention, the operational power required for fixing and replacing the base plate 5 may be as small as the spring force, and the changing operation of the die can be simply and manually effected without the use of pneumatic or hydraulic power. It is true that the operation time for changing die can be shortened if the die changing apparatus is actuated by the pneumatic or hydraulic power, however, there is no substantial difference in the operation time between the manual operation and the pneumatic or hydraulic operation, and it is considered that the disadvantages resulting from the pneumatic or hydraulic operation are much bigger than the manual operation. The manual operation of the eccentric shaft 13 is advantageous in that the tensile strength of the spring 15 and the entry of the guide pins 12 into the guide holes can be appreciated by the operator's feeling and every possible disorder or trouble can be detected in advance. However, it is to be understood that the eccentric shaft 13 may be rotated by making use of the hydraulic or pneumatic power, if necessary, by the addition of a cylinder or the like. As explained hereinabove, the die changing apparatus according to the present invention is so simply constructed, and the appearance and disappearance of the guide pins can be visually observed. Thus, it can be used with confidence, and the reliable operation can be assured. Furthermore, it is easy to repair and exchange the component parts and it is possible to be applied in a wide range, because the die set is not required to undergo the complicated processing.

As is apparent from the foregoing explanation, the die changing device according to the present invention is not provided with any projection on the upper surface of the lower plate 1 on which the base plate 5 is mounted. Therefore, chips or dusts dispersed on the upper surface of the lower plate 1 can be easily cleaned, and the base plate 5 can be always mounted on the clean surface of the lower plate 1. If there exists a foreign substance between the base plate 5 and the surface on which the base plate 5 is positioned, the die is tilted or bent due to the applied pressure. The intimate contact of the base plate to the mounting surface is extremely important in the press work operation. Thus, the die changing apparatus according to the present invention is particularly suitable for a precision press work operation. In this manner, the brackets 81-84 mounted on the low plate 1 of the die set are subjected to be operated as explained hereinabove, and the same operation is effected to the upper plate which is the same structures as that of the lower plate 1, thereby to complete the fixing or exchanging operation of the upper and lower dies which are accurately in alignment and firmly clamped.

In the embodiment explained hereinabove, the die changing apparatus using the die set has been explained as an example, however, it is to be understood that the present invention is not limited to this particular example. For example, it is possible to be applied to a jig used for a machine work to mount the die on the base plate 5 or an alignment jig used for fixing male and female dies to the respective base plates 5 with a uniform clearance therebetween. In this case, if the outer dimension of the base plate, the inner diameter and the position of the guide holes 7 are standardized and if there are provided various jigs and apparatuses on which the standardized base plate is mounted, the die changing apparatus can be applicable in the continuous press work which includes the machining of the base plate, aligning and changing the dies. This makes it possible to systematize the continuous press work operation.

In the above embodiment, each of the eccentric shafts 13 is manually and independently rotated by connecting the handle 20 to the respective shafts, however, it is possible to drive the two eccentric shafts simultaneously with the use of two handles 20 connected to the respective shafts. In this case, it is not required to synchronize the movement of the right and left eccentric shafts 13. The right and left eccentric shafts of the upper plate can be simulteneously operated, however, the handles 20 connected to the eccentric shafts of the upper plate is desired to be detouchable so as to prevent as accidental rotation of the eccentric shaft 13 in the releasing direction of the clamp by the impingement of something on the handles 20 which remain connected to the eccentric shafts and to prevent the falling of the base plate mounted on the upper plate. In order to eliminate such accident, a groove may be provided at one end of the stem section 13b of the shaft 13 so that the eccentric shaft 13 may be rotated by inserting a screw-driver into the groove, instead of using the handle 20.

Figures 7, 8:
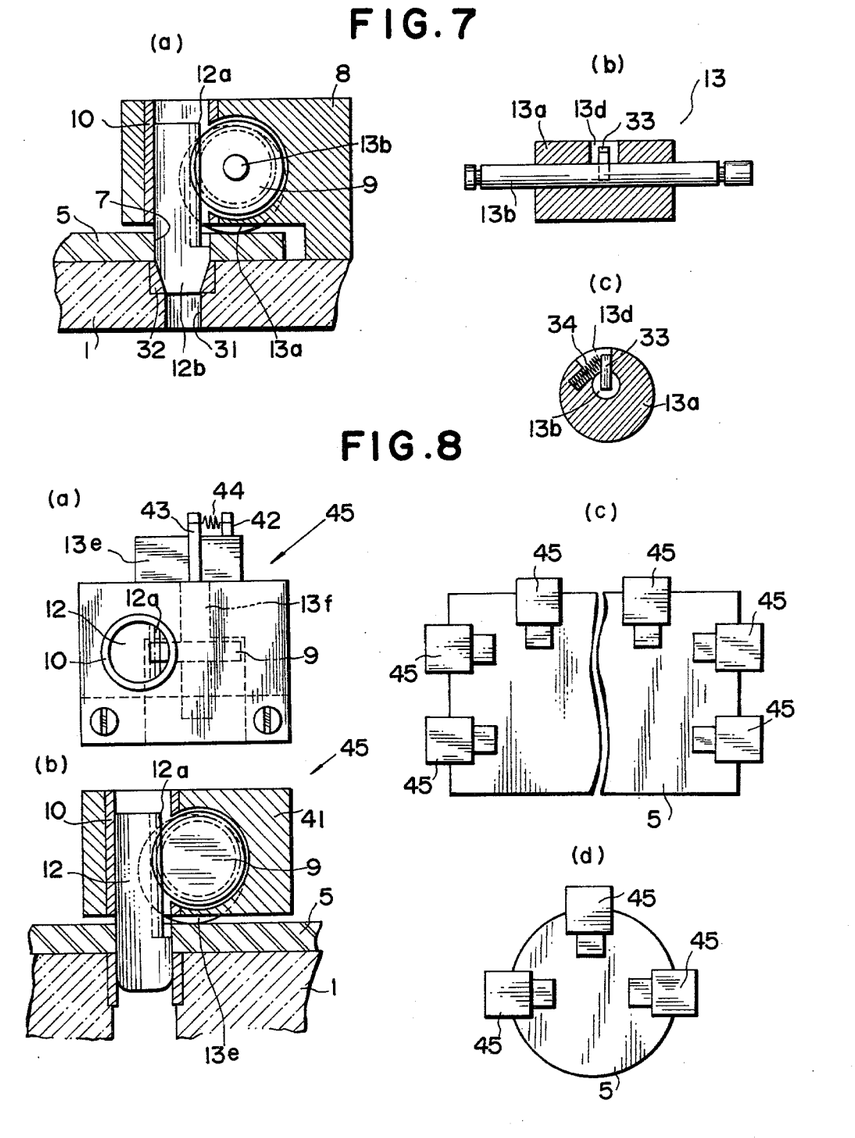
FIGS. 7(a), 7(b) and 7(c) are vertical sections of portions of a die changing apparatus according to another embodiment of the present invention.
FIGS. 8(a), 8(b), 8(c) and 8(d) show plan views and a vertical section of a portion of a die changing apparatus according to another embodiment of the present invention, respectively.

In the embodiment explained hereinabove, the guide pin 12 having the same diameter as that of the bush 4 except its tapered end top is used, however, it is possible that the entire end of the pin 12 to be inserted into the bush may be tapered and the inner circumferential surface of the bush may be formed so as to fit in the tapered end of the pin 12 so that the guide pin comes into contact with the inner surface of the bush very closely without creating any play and causing the inclination of the guide pin when the pressure is exerted to the base plate in its lateral direction during the press operation. This will be explained in an embodiment explained in connection with FIGS. 7a to 7(b).

In FIGS. 7(a) and 7(b), the like reference numerals designate the same parts shown in FIGS. 1 to 6.

In the embodiment shown in FIGS. 7(a) and 7(b), there are provided a plurality of bushes 32 which correspond to the bushes 4 shown in FIG. 2. Each of the bushes 32 has a tapered inner circumferential surface and is press-fitted in the lower plate 1 of the die set as explained hereinbefore. Guide pin 12 has a frust-conical tapered end 12b which fits the inner circumferential surface of the bushes 32 so that the guide pin 12 may come into close contact with the bush 32.

In this instance, there is a possibility that the guide pin 12 can not be lowered to the position where the tapered end 12 of the guide pin 12 comes into full contact with the inner surface of the bush 32 depending upon the engaging condition of the pinion 9 with the rack 12a of the guide pin 12. In order to eliminate such inconvenience, the eccentric shaft 13 may be formed in such manners that the eccentric section 13a is not integral with the stem section 13b but is rotatable with respect to the stem section 13b as shown in FIGS. 7(b) and 7(c) and further that a slot 13d is formed in a portion of the eccentric section 13a while a pin 33 is embedded radially in the outer circumference of the stem portion 13b so as to be nested in the slot 13d and a compression spring 34 is interposed between the wall of the slot 13d and the pin 33 as shown in FIG. 7(c).

In the above arrangement, the guide pin 12 is entered into the bush 32 provided on the lower plate 1 through the guide hole 7 of the base plate 5 by the rotation of the pinion 9. In the embodiment shown in FIG. 7, if the eccentric section 13a of the eccentric shaft 13 runs against the base plate 5 before the tapered end top 12b of the guide pin 12 comes into contact with the bush 32 according to the engaging condition of the pinion 9 with the reck section 12a of the guide pin 12, the eccentric section 13a will continue to rotate while compressing the spring 34, the elastic force of which is weaker than that of the spring 15 shown in FIG. 1, and the guide pin 12 will come to contact with the tapered surface of the bush 32 without any play, whereby the resistance of the guide pin against the applied pressure exerted from the lateral direction is increased and the maintenance of a high degree and accurate positioning of the base plate 5 during the press working operation is assured.

FIGS. 8(a) and 8(b) show plan views and vertical sectional views of a die changing apparatus according to another embodiment of the present invention. The die changing apparatus according to this embodiment includes a shaft 13f supported in a cantilever fashion within a bracket 41 on which an eccentric section 13e and a single pinion 9 engaging with the rack 12a of the guide pin 12 are mounted and a spring 44 biasing a hook pin 42 embedded in one end surface of the eccentric section 13e and a pin 43 embedded in the outer side surface of the bracket 41 is provided.

The die changing apparatus according to this embodiment is particularly suitable for provision around the base plate as large members as are necessary in such a manner as shown in FIGS. 8(c) and (d). If the brackets 45 are arranged around the base plate as shown in FIGS. 8(c) and (d), the accurate positioning of the die can be attained, and the die changing apparatus can sufficiently resist against the lateral force applied parallel to the base plate 5, and the changing operation of the large-sized die mounted on the large-sized and heavy base plate 5 can be performed reliably and quickly.

Furthermore, the brackets 45 according to this embodiment are applicable to a base plate of any suitable shape, such as, for example, a circular base plate as shown in FIG. 8(d).

Obviously, many modifications and variations of the present invention are possible in the light of the above teachings. It is therefore to be understood that within the scope of the appended claims, the invention may be practiced otherwise than as specifically described.

What is claimed as new and desired to be secured by letters patent of the United States is:

1. A die changing apparatus for press comprising:
    a base having a plurality of holes;
    a base plate for mounting a die to be fixed to the surface thereof having guide holes at positions corresponding to the holes of the base;
    brackets mounted on the base overhanging over the surface of the base so as to have gaps between the surface of the base and the underside of the brackets for positioning the base plate;
    the brackets being provided with holes at the positions corresponding to the guide holes of the base plate and the holes of the base as to be communicated therewith;
    eccentric shafts supported by the brackets horizontally extending through the brackets in parallel relationship with the base plate;
    the eccentric shafts being provided with eccentric cams and pinions coaxially mounted thereon for clamping and positioning the base plate with respect to the base;
    guide pins being reciprocatable within the holes in the brackets for positioning the base plate with respect to the base to be tightly inserted into the guide holes of the base plate and the holes of the base;
    the guide pins being provided with racks engaging with the pinions provided on the eccentric shafts; and
    a means for biasing the guide pins in the position of entering into the guide holes of the base plate and the holes of the base.

2. The die changing apparatus for press as defined in claim 1, wherein each of the eccentric shafts extending at least two brackets is made of a single shaft on which two pinions for engaging with the racks of the guide pins in each of the brackets and an eccentric cam for clamping the base plate to the surface of the base are mounted.

3. The die changing apparatus for press as defined in claim 2, wherein the eccentric shaft is provided with the pinions at both ends thereof and the eccentric cam at the center thereof.

4. The die changing apparatus for press as defined in claim 3, wherein one of the pinions is provided with a pin horizontally projecting from an offset portion of the pinion to hook the biasing means.

5. The die changing apparatus for press as defined in claim 4, wherein the brackets further include a pair of upper and lower stop pins against which the pin provided on the pinion strikes for regulating the extent of the rotation of the pinion.

6. The die changing apparatus as defined in claim 3 wherein one of the pinions is provided with a pin horizontally projecting from an offset portion of the pinion to fix a handle for rotating the eccentric shaft 7. The die changing apparatus for press as defined in claim 1, wherein the guide pins are tapered at the ends thereof.

8. The die changing apparatus for press as defined in claim 7, wherein the holes of the base are tapered around the inner circumference thereof for receiving the tapered ends of the guide pins.

9. The die changing apparatus for press as defined in claim 1, wherein the eccentric cams are rotatable with respect to the eccentric shafts and provided with slots in which pins radially extending from the eccentric shafts are projected, and the pins are biased against walls of the slot by compression springs.

10. The die changing apparatus for press as defined in claim 1, wherein the gaps between the surface of the base and the underside of the brackets are wider that the thickness of the base plate.

* * * * *

UNITED STATES PATENT AND TRADEMARK OFFICE
CERTIFICATE OF CORRECTION

PATENT NO. : 4,274,332
DATED : June 23, 1981
INVENTOR(S) : IWAO NAKAMURA

It is certified that error appears in the above—identified patent and that said Letters Patent is hereby corrected as shown below:

On the cover sheet Insert

[73]--Assignee:

Futaba Denshi Kogyo Kabushiki Kaisha

Mobara-shi, Chiba-ken, JAPAN --,

Signed and Sealed this

Twenty-seventh Day of October 1981

[SEAL]

Attest:

GERALD J. MOSSINGHOFF

Attesting Officer     Commissioner of Patents and Trademarks